(12) United States Patent
Drust (10) Patent No.: US 9,969,239 B2
(45) Date of Patent: May 15, 2018

(54) RESILIENT PIVOT ASSEMBLY

(71) Applicant: Craig Drust, Birmingham (GB)

(72) Inventor: Craig Drust, Birmingham (GB)

( * ) Notice: Subject to any disclaimer, the term of this patent is extended or adjusted under 35 U.S.C. 154(b) by 0 days. days.

(21) Appl. No.: 15/120,384

(22) PCT Filed: Feb. 21, 2015

(86) PCT No.: PCT/GB2015/000061
§ 371 (c)(1),
(2) Date: Aug. 19, 2016

(87) PCT Pub. No.: WO2015/124896
PCT Pub. Date: Aug. 27, 2015

(65) Prior Publication Data
US 2017/0066300 A1 Mar. 9, 2017

(30) Foreign Application Priority Data
Feb. 22, 2014 (GB) .................................. 1403195.9

(51) Int. Cl.
F16C 27/02 (2006.01)
B60G 21/055 (2006.01)
(Continued)

(52) U.S. Cl.
CPC ........ B60G 21/0551 (2013.01); F16C 11/083 (2013.01); F16C 23/04 (2013.01);
(Continued)

(58) Field of Classification Search
CPC .... B60G 21/0551; F16C 11/04; F16C 11/045; F16C 11/08; F16C 11/083; F16C 27/063; F16F 1/045; F16F 1/12; F16F 1/16
See application file for complete search history.

(56) References Cited

U.S. PATENT DOCUMENTS 3,177,744 A * 4/1965 Davidson ............... B23Q 7/008
                                                     279/66
4,136,787 A * 1/1979 Forster ..................... B61G 7/12
                                                   213/221
(Continued)

FOREIGN PATENT DOCUMENTS

DE      2 160 022 A1    6/1973
DE        2160022 A1 * 6/1973 ............... B60G 7/02
(Continued)

OTHER PUBLICATIONS

International Search Report (PCT/ISA/210) dated Jun. 18, 2015, by the European Patent Office as the International Searching Authority for International Application No. PCT/GB2015/000061.
(Continued)

*Primary Examiner* — Phillip A Johnson
(74) *Attorney, Agent, or Firm* — Buchanan Ingersoll & Rooney PC (57) ABSTRACT

A resilient pivot assembly including: a first housing member and a second housing member held together side-by side; and configured to present a central aperture sized to accept a shaft or shaft sleeve wherein the first housing member has a first groove/channel and the second housing member has a second groove/channel; a shaft with a third groove/channel that extends at least partly around the circumference of the shaft or the outer surface of a sleeve; where the first, second and third grooves/channels cooperate to form a generally annular shaped channel that houses at least one tubular shaped resilient member and supports the shaft so that it may readily partly or fully rotate about its axis.

17 Claims, 6 Drawing Sheets

(51) Int. Cl.
*F16C 11/08* (2006.01)
*F16C 23/04* (2006.01)
*F16C 27/06* (2006.01)
*F16F 1/04* (2006.01)
*F16F 1/16* (2006.01)
*F16F 1/14* (2006.01)

(52) U.S. Cl.
CPC ............ *F16C 27/063* (2013.01); *F16F 1/045* (2013.01); *F16F 1/14* (2013.01); *F16F 1/16* (2013.01); *B60G 2204/1222* (2013.01); *B60G 2204/1224* (2013.01)

(56) References Cited

U.S. PATENT DOCUMENTS

| | | | | |
|---|---|---|---|---|
| 4,681,235 A | * | 7/1987 | Forster | B61G 9/06 213/221 |
| 5,352,044 A | * | 10/1994 | Jordens | B60G 21/0551 384/140 |
| 2010/0029145 A1 | | 2/2010 | Balsells et al. | |
| 2012/0211958 A1 | | 8/2012 | Lam | |

FOREIGN PATENT DOCUMENTS

| | | | | |
|---|---|---|---|---|
| EP | 0 770 506 A1 | 5/1997 | | |
| GB | 891 621 A | 3/1962 | | |
| KR | 10-2011-0010899 A | 2/2011 | | |
| WO | WO-2006124969 A2 | * 11/2006 | ............ | F16F 1/045 |
| WO | WO 2007/126359 A1 | 11/2007 | | |
| WO | WO-2013121674 A1 | * 8/2013 | ............ | F16F 1/3835 |

OTHER PUBLICATIONS

Written Opinion (PCT/ISA/237) dated Jun. 18, 2015, by the European Patent Office as the International Searching Authority for International Application No. PCT/GB2015/000061.
Great Britain Search Report dated Dec. 16, 2014 by the Great Britain Patent Office for Application No. GB 1403195.9 (2 pages).

* cited by examiner

RESILIENT PIVOT ASSEMBLY

TECHNICAL FIELD

The present invention relates to an assembly (bush) that resiliently supports a shaft allowing it to freely pivot or fully rotate about its axis. The assembly may be used as part of an automobile vehicle and also a wide range of other mechanical engineering applications.

BACKGROUND

Bushes are widely used to support shafts, rods, etc. so that they may (at least) pivot axially relative to the bush and/or bush housing. Sometimes, they may allow complete rotation of the rod or shaft relative to the housing; however, unlike bearings this is not their principle function. Often, it is desirable for bushes to limit or prevent axial movement of the supported rod or shaft; alternatively, sometimes it may be desirable to allow such movement. Bushes used on automobile vehicles are often made of rubber or a similar resilient material and are generally housed in a metal enclosure, for example "U-shaped" housings that can be bolted to the vehicle chassis. Such bushes with housing members are widely used to support automobile "anti-roll bar" assemblies and also general suspension components; typically the housings are bolted to a part of the vehicle chassis or sub-frame. While such bushes provide adequate support and allow at least some rotation (as required) or pivoting of the rod or shaft relative to the bush and housing, they typically have a relatively short life and so require replacement with consequent servicing costs.

Impact resistance of a bush and housing is typically an important characteristic; allowing impact forces to be absorbed rather than resulting in stress-cracking and failure typical of bushes that use rigid components. While the durability of a bush may be increased by using less resilient (springy) construction materials, this tends to result in a bush that has reduced impact resistance. Unfortunately, it is this very desirable quality of resilience (springiness) that leads to the use of rubber or rubber-like materials with their inherent lack of durability.

DISCLOSURE OF INVENTION

An aim of the present invention is to provide a resilient pivot assembly that has improved durability without any sacrifice of resilience. A further aim is to provide a resilient pivot assembly where the resilient member(s) can be easily replaced if they become worn or damaged. Another aim is to provide a resilient pivot assembly where the degree of resilient support can be modified to meet changing requirements, without replacing the bush housing. Yet another aim is to provide a resilient pivot assembly that prevents any significant movement of the shaft in an (longitudinal) axial direction.

In one aspect the invention comprises resilient pivot assembly having: a first housing member and a second housing member held together side-by side; and configured to present a central aperture (A) sized to accept a shaft or shaft sleeve wherein said first housing member has a first groove/channel and said second housing member has a second groove/channel; a shaft with a third groove/channel that extends at least partly around the circumference of the shaft or the outer surface of a sleeve; where said first, second and third grooves/channels cooperate to form a generally annular shaped channel/duct (C) that houses at least one resilient member; such that in use said shaft is resiliently supported within said at least first and second housing members by said at least one resilient members such that said shaft may readily pivot (partly rotate) or fully rotate about the axis (A-A') of said shaft.

Preferably, the resilient member abuts against inside walls of the annular channel (C) or fits tightly within and thereby prevents or restrains any significant movement of the shaft in an axial direction. The first groove/channel and said second groove/channel are normally held together end-on end.

The shaft may have a bore, or the sleeve may have a bore; said bore being sized to accept a shaft or rod. The shaft or sleeve may have a bore; said bore being sized to accept a shaft (or rod etc.). The sleeve may also be split and have appropriate spacers to facilitate assembly over a pre-existing roll bar or any other shaft, rod, or bar.

Preferably, the said first groove/channel, said second groove/channel and said third groove/channel cooperate to form a generally annular shaped channel/duct (C) that is substantially circular in cross section.

Preferably, the arcuate axis of resilient member (34) is held generally perpendicular to longitudinal axis (A-A') of shaft (30).

Preferably, the resilient member is tubular shaped or cylindrically shaped or generally cylindrically shaped before assembly within housings; and more preferably the resilient member is a helical spring. Herein, the term "generally cylindrically shaped" includes resilient members that have approximately elliptical cross sections, and refers to the shape of the resilient member prior to assembly of the apparatus.

The pivot assembly may comprise a plurality of channels/ducts (C) such that said shaft is resiliently supported at plurality of circumferential locations along its axis The pivot assembly may comprise a single channel (C) and a single groove (32) that extends around the circumference of said shaft; wherein the shaft and/or the aperture (A) are tapered so as to allow greater non-axial (pivotal) movement of the shaft relative to the housing.

Preferably, said first, second and third grooves in the housing members and the shaft/sleeve co-operate to provide at least one annular channel/duct (C) located between the inside face of the cylindrical aperture (A) and the shaft groove(s); that in use surround between 50% and 70% of the circumference of the resilient member(s), and preferably 55% to 65% of the circumference of the resilient member(s); such that when during assembly said at least one resilient member is pressed within these channels; or end-fed within these channels, it stays in place. Preferably, said first, and second grooves in the housing members and the co-operate to provide at least one annular channel located on the inside face of the cylindrical aperture (A); that in use surround between 25% and 35% of the circumference of the resilient member(s), and preferably 27.5% to 32.5% of the circumference of the resilient member(s);

The central aperture (A) need not necessarily be circular in cross-section (in an axial direction); for example it may be elliptical, or polygonal in cross-section. Preferably the aperture (A) and/or the shaft have a circular cross section; preferably the shaft has a diameter 0.1 to 20 mm less than the diameter of the aperture (A); more preferably 0.1 to 6 mm less than the diameter of the aperture (A); and most preferably 0.4 to 1.5 mm less than the diameter of the aperture (A). Spacers may be located between said at least first and second housing members.

Said resilient pivot assembly may form part of or support an anti-roll bar mechanism. The resilient pivot assembly may be used within a vehicle suspension system; for example forming part of a vehicle wishbone suspension member. Alternatively, the resilient pivot assembly of the present invention may be used for a wide range of other mechanical engineering applications.

BRIEF DESCRIPTION OF DRAWINGS

The present invention is illustrated by the following diagrammatic figures in which.

DETAILED DESCRIPTION

FIGS. 1 to 8 illustrate resilient pivot assemblies according to a four embodiments of the invention.

Often, it is desirable to provide a pivoting system that limits or prevents lateral movement of a bar or shaft supported thereby. The embodiments illustrated in FIGS. 1 to 6 provide such support to bars, shafts, rods and the like.

Figure 1:
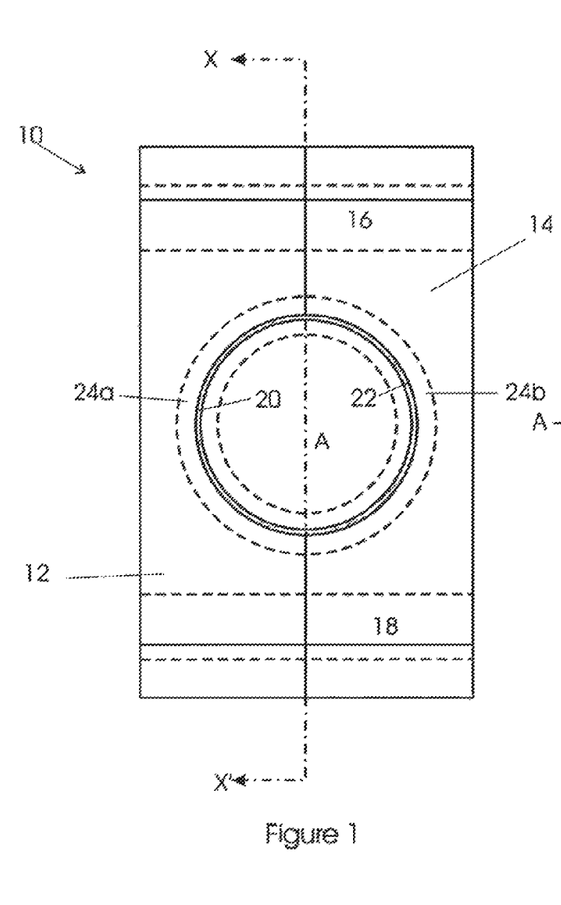
FIG. 1 shows an end view of a resilient pivot assembly according to a first embodiment of the invention.
Figure 2:
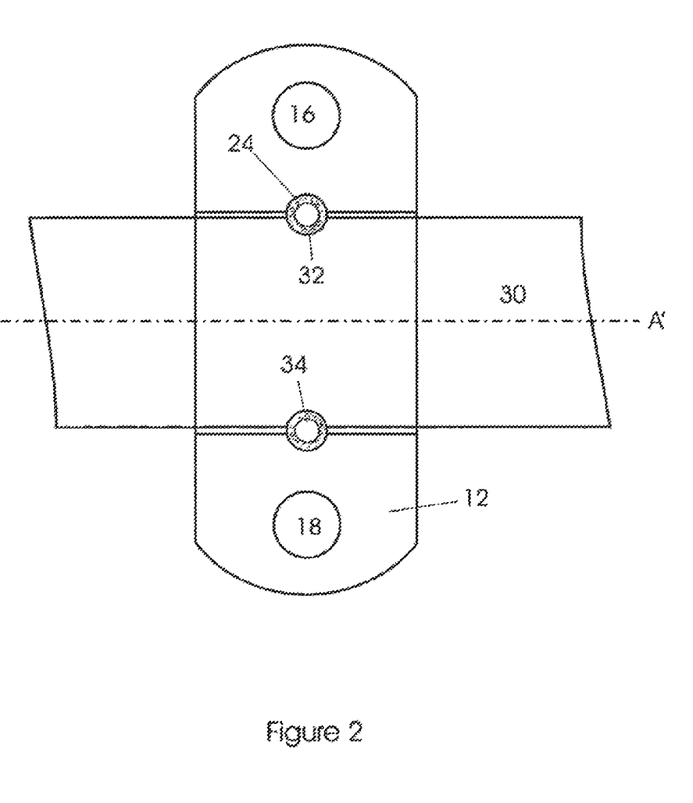
FIG. 2 shows a sectioned (along the line X-X') side view of the resilient pivot assembly of FIG. 1.

FIGS. 1 and 2 illustrate a first embodiment of the invention. The resilient pivot assembly (10) comprises a first housing member (12) and a second housing member (14) that in use are typically bolted side-by side (see FIG. 1) using bolts (not shown) and bolt holes (16, 18). The bolts may also secure the pivot assembly (10) to a vehicle chassis etc. (not shown).

The first and second housing members (12, 14) as illustrated in FIG. 1 are mirror images of each other; however, this is not an essential requirement and many alternatives will be apparent to the person skilled in the art. Indeed, the housing may comprise more than two main parts (12, 14) (see latter); however, when the housing is assembled it will present a central aperture (A) sized to accept the bar, shaft or rod etc. that it in use supports.

In the present embodiment the central (generally cylindrically shaped) aperture is formed by a first curved surface (20) in the first housing member (12) and a second curved surface (22) in the second housing member (14). These first and second curved surfaces (20, 22) also have first and second grooves/channels (24a and 24b respectively) that are approximately semi-circular in cross section and extend along an arcuate axis that is generally perpendicular to the longitudinal axis (A-A') of the shaft (30). The first and second circumferential channels (24a, 24b) of the housing members co-operate to provide a continuous annular channel (of approximately semi-circular cross section) around the inside face of the cylindrical aperture (A).

The resilient pivot assembly (10) further comprises a shaft member (30); in this example having a circular cross section; the diameter of the shaft member (30) being slightly less (typically 0.4 to 1.5 mm) less than the diameter of the aperture (A). The shaft member (30) has a circumferential channel (32) that extends along an arcuate axis that is generally perpendicular to the longitudinal axis (A-A') of the shaft. In use, the first and second channels (24a, 24b) and the circumferential channel (32) of the shaft member co-operate to present an annular channel/duct (C) into which at least one; and typically two or three, resilient members (34) are located. Typically, these resilient members will comprise tightly wound helical springs. However, other generally cylindrically shaped (before insertion within the annular channel) resilient members may be used; for example lengths of relatively thick walled (typically 1-5 mm) neoprene plastic tubing or the like.

The resilient members (34) support the shaft within the housing allowing it to readily pivot (partly rotate) relative to the housing but without being able to move axially relative to the housing. In this case, the use of a single annular channel (C), allows the shaft axis (A-A') to deviate/pivot slightly from the central axis of the aperture (A). This additional freedom of movement is advantageous in some applications of the assembly (10). If necessary, the shaft (30) can fully rotate within the housing (12, 14). However, for typical bush support applications (see below) this will not be necessary.

The resilient member(s) (34) are typically cylindrical in shape before insertion within the annular channel. In the embodiment illustrated in FIGS. 1 and 2 a single resilient member(s) may be inserted when the assembly is first assembled or if it requires replacement due to wear or fracture. When the resilient member comprises a helical spring it will be extremely durable and not generally prone to cracking or fracture due to a shock load. As mentioned above, several (shorter) resilient members may be used instead of a single resilient member. Preferably, in such a situation the combined lengths of the resilient members will be only slightly less than the circumference of the single annular channel/duct (C).

Figure 3:
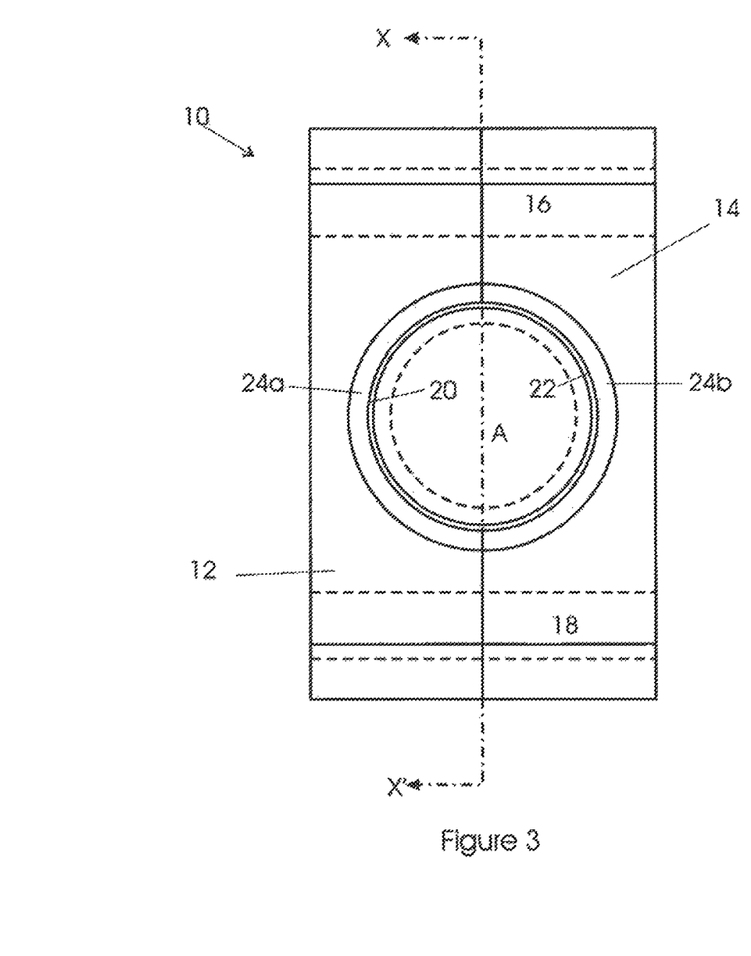
FIG. 3 shows an end view of a resilient pivot assembly according to a second embodiment of the invention.
Figure 4:
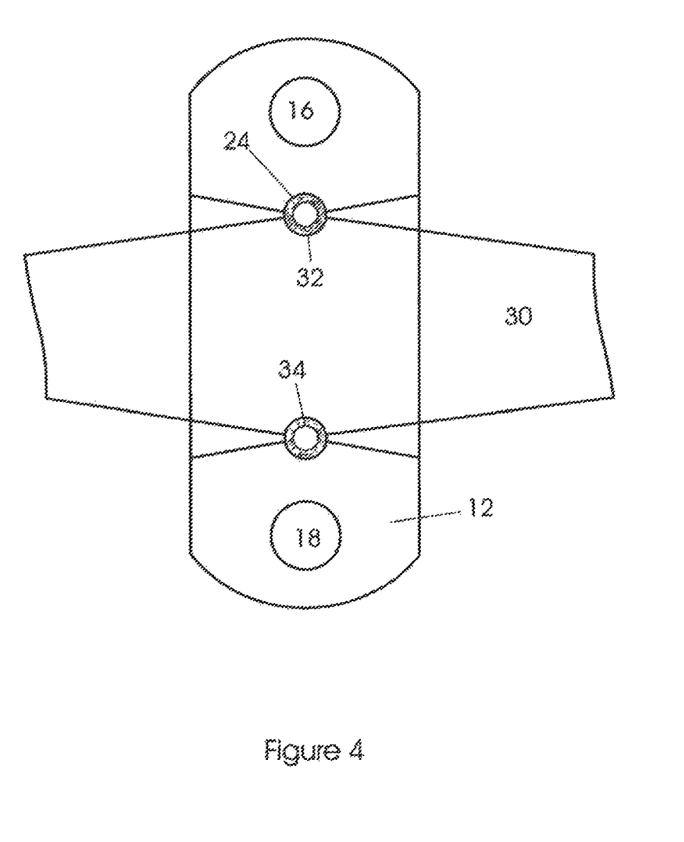
FIG. 4 shows a sectioned (along the line X-X') side view of the resilient pivot assembly of FIG. 3.

FIGS. 3 and 4 show a second embodiment of the invention. This embodiment differs from the above described first embodiment in that it has a non-cylindrically shaped shaft (30); this shaft has a circular cross section (in axial direction) but is tapered such that the maximum diameter occurs in the region where the shaft (30) is resiliently supported by one or more resilient members (34) located in a single annular channel (C). In the embodiment illustrated the aperture (A) is not cylindrical but also tapers such that it has the smallest cross section in the region where the shaft is resiliently (34) supported. It is not essential that either the aperture (A) or the shaft (30) have a circular cross section (in an axial direction); although this will normally be the case. Also it is not essential that both the aperture (A) and shaft (30) are tapered; just one of these members may be tapered. The purpose of tapering one or both of these items is to allow greater freedom of movement of the central axis of the shaft (A-A') relative to the central axis of the housing. Apart from the above-described differences, this second embodiment is substantially the same as the first embodiment.

Figure 5:
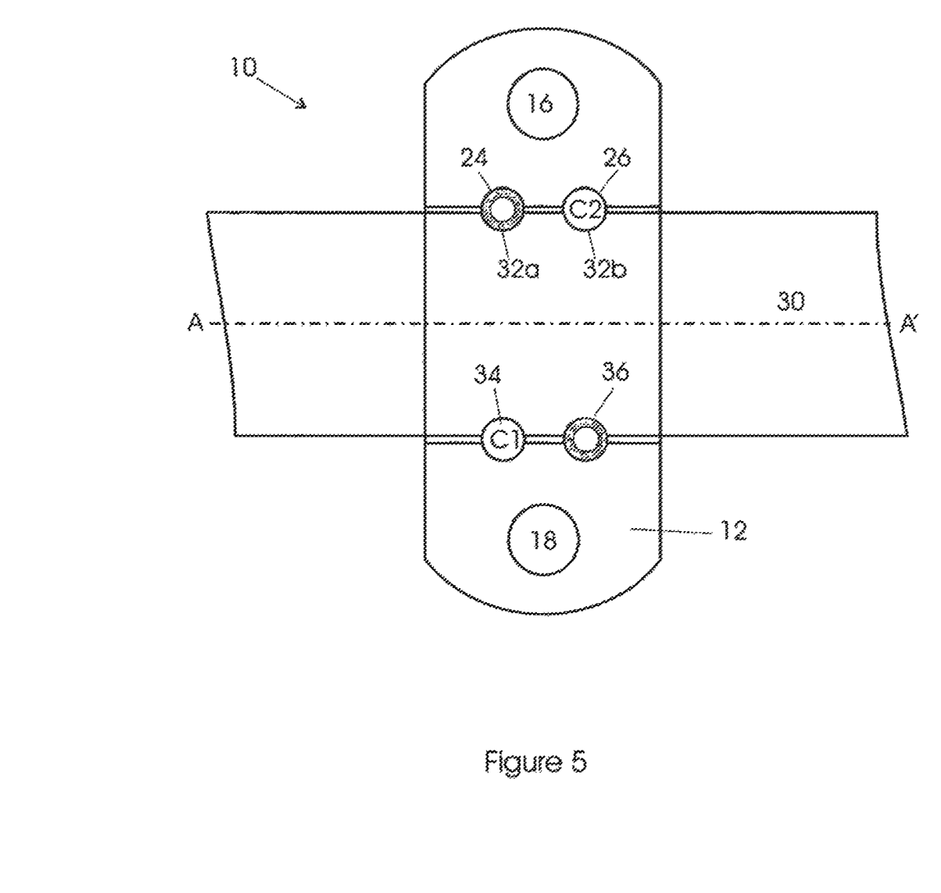
FIG. 5 shows a sectioned side view (as for FIG. 2) of a resilient pivot assembly according to a third embodiment of the invention.
Figure 6:
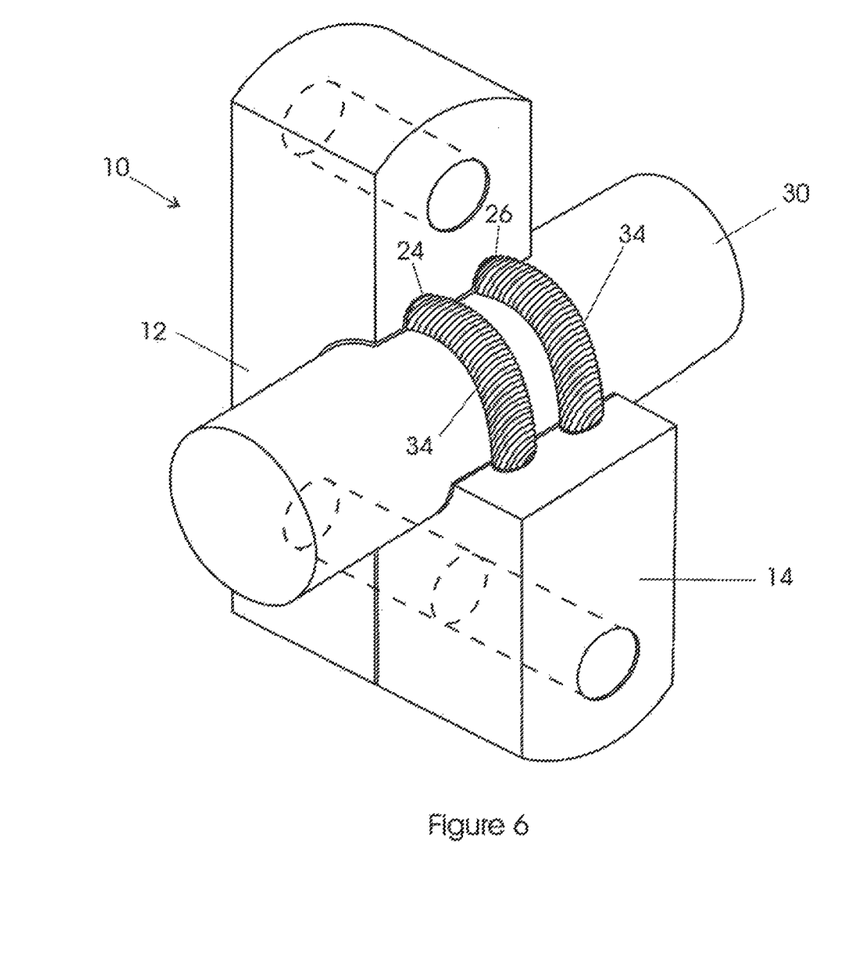
FIG. 6 shows a perspective view of the resilient pivot assembly of FIG. 5, with part cut-away to show the configuration of the cylindrically shaped (when separated from the assembly) resilient members.

FIG. 5 shows a third embodiment of the invention; the end view for this embodiment is identical to FIG. 1; FIG. 6 shows a sectioned (along the line X-X' of FIG. 1) side perspective view of the resilient pivot assembly.

Again, a central (generally cylindrically shaped) aperture (A) is formed by a first curved surface in the first housing member (12) and a second curved surface in the second housing member (14). These first and second curved surfaces also each have a pair of first and second circumferential channels (24, 26 respectively) that are approximately semi-circular in cross section and extend along an arcuate axis that is generally perpendicular to the longitudinal axis (A-A') of the shaft (30). The pair of first and second circumferential channels (24, 26) co-operate (being located end-to-end) to provide two continuous annular channels; of approximately semi-circular cross section; around the inside face of the cylindrical aperture (A).

The resilient pivot assembly (10) further comprises a shaft member (30) in this example having a circular cross section; the diameter of the shaft member (30) being slightly less (typically 0.4 to 1.5 mm) less than the diameter of the aperture (A). The shaft member (30) has a pair of circumferential channel (32a, 32b) that extends along an arcuate axis that is generally perpendicular to the longitudinal axis (A-A') of the shaft. In use, the first and second channels (24, 26) and the circumferential channels (32a, 32b) of the shaft member co-operate to present two approximately annular channels/ducts (C1 and C2) into which at least one; and typically two or three, resilient members (as described above) (34) are located. Thus, the shaft (30) is supported radially at two locations by the use of said two annular channels (C1, C2) containing said resilient members (34). Again, the shaft can readily axially pivot (about its longitudinal axis) within the housing but cannot easily move axially relative to the housing. Also, in this third embodiment the use of two annular channels etc., restrains pivotal movement of the shaft axis relative to the central axis of the housing aperture; and so allows less such movement than the embodiments described above.

FIG. 6 shows a perspective view with the housing partially cut away to reveal details of cross section shape and the orientation of the resilient member(s) (34); in this case several tightly-wound helical springs.

Figure 7:
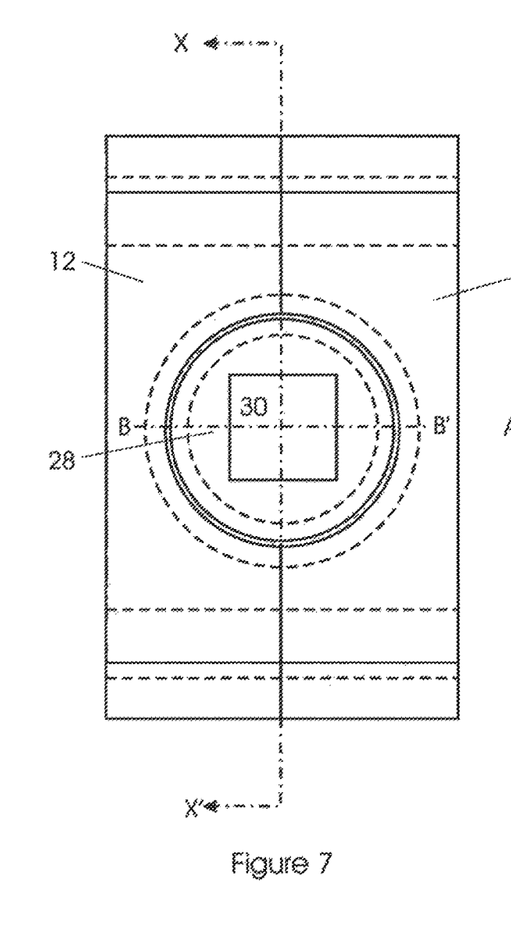
FIG. 7 shows an end view of a resilient pivot assembly according to a fourth embodiment of the invention.
Figure 8:
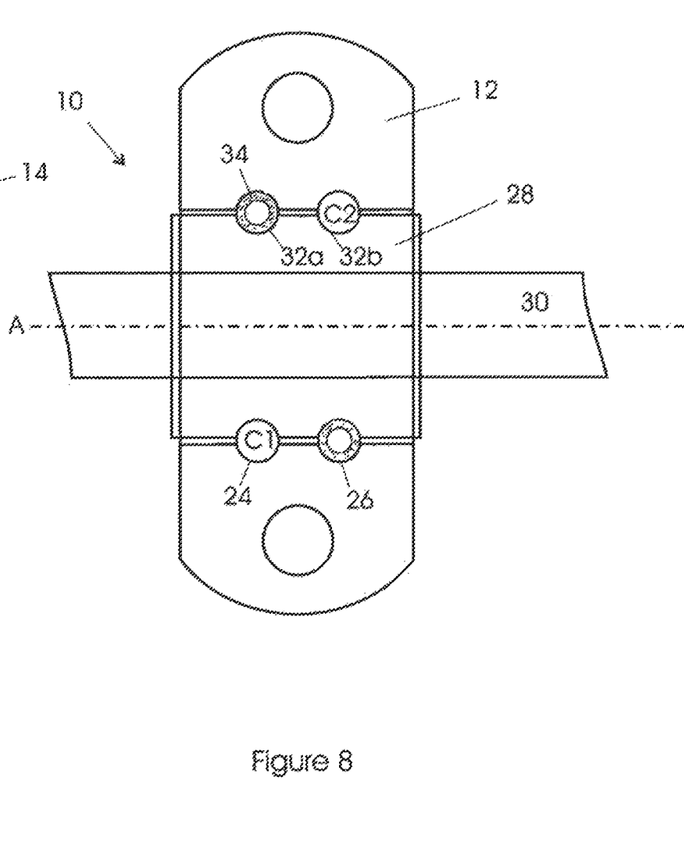
FIG. 8 shows a sectioned (along the line X-X') side view of the resilient pivot assembly of FIG. 7.

FIGS. 7 and 8 illustrate a fourth embodiment of the invention. This differs from the shaft (30) of the third embodiment (see FIGS. 5-6) which in this embodiment is replaced by a sleeve (28) that again has a pair of circumferential grooves (32a, 32b) that cooperate with grooves 24 and 26 to provide (for example) two annular channels/ducts (C1, C2) that house the resilient member(s) (34). In this embodiment a shaft (30) is supported within a tubular aperture within the sleeve (28), the axis of which coincides with the axis of the sleeve (28). This example shows a shaft (30) of square cross section; however the aperture in the sleeve may be configured to engage a variety of shaft shapes (cross section); for example polygonal, elliptical, circular etc. Normally, the shaft will engage the sleeve so that in use they turn/pivot together. The sleeve will normally be about the same width as that of the combined housing members (12, 14). Sleeve 28 can also be split; for example along the line B-B' (see FIG. 7) and have appropriate spacers; to facilitate assembly over a pre-existing roll bar or any other shaft (30), rod, or bar.

Figure 9:
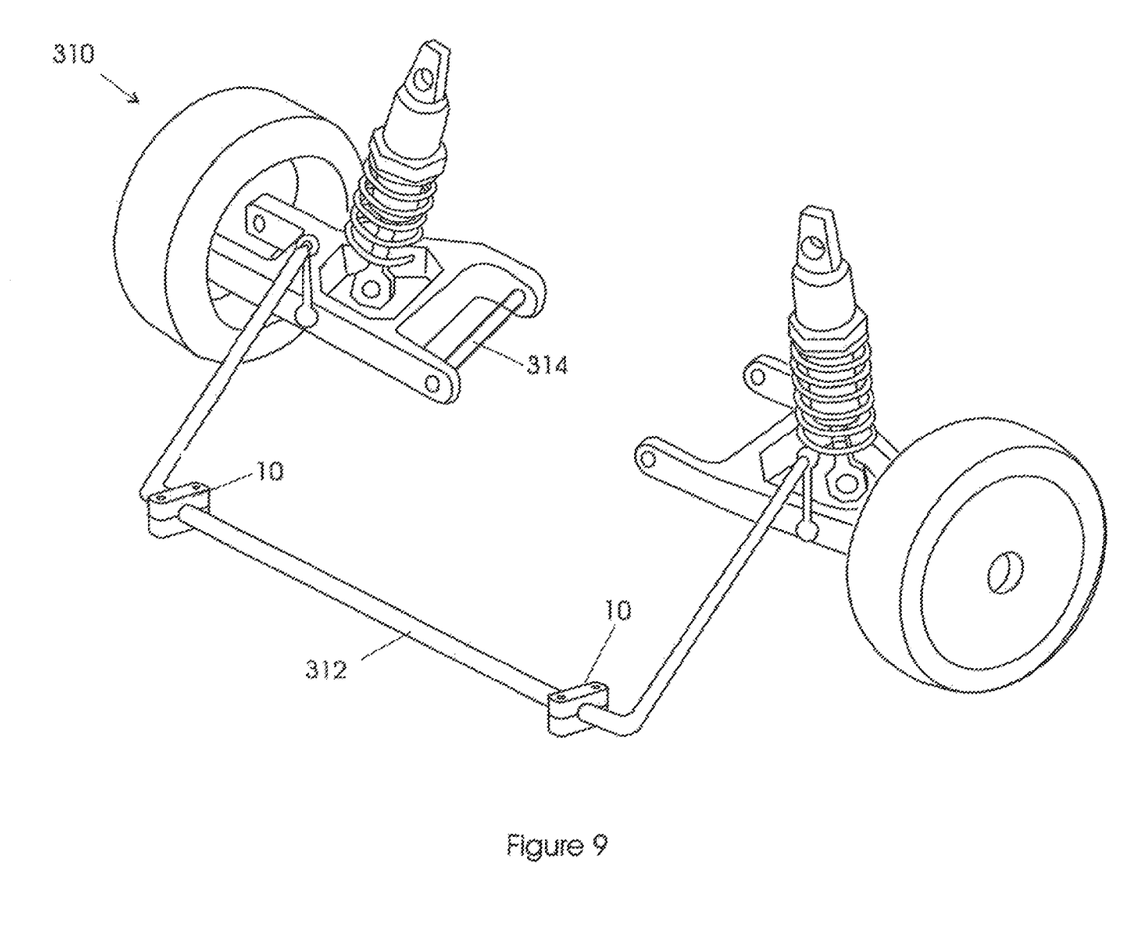
FIG. 9 shows a perspective view of resilient bushes according to the present invention being used to support the anti-roll bar and other suspension components of an automobile vehicle.

FIG. 9 illustrates how assembly (10) according to the present invention may be used to support the anti-roll bar (312) of an anti-roll bar mechanism for an automotive vehicle (310). Such an assembly (10) may also be used to pivotally support other vehicle components such as a bar (314) forming part of a front vehicle wishbone suspension member.

Preferably, the resilient member (34) comprises a helical spring; and preferably said grooves/channels (24, 26) are arcuate in cross section. When the spring/resilient member is a helical spring it may have an additional member within it; for example, a suitably sized cylindrical insert made of a resilient material such as rubber. This may advantageously further increase the resilience of the spring.

The helical spring(s) detailed in the above embodiments may have open or closed ends (ground or not ground) or may comprise a plurality of (interconnect able) garter springs. Further, they may be compression springs or tension springs (including springs similar to those used for pipe bending). The springs will normally made from steel or similar metals/alloys, but can be plastic springs or plastic coated metal springs.

It is not essential that the resilient member be a spring. Thus, the resilient member could be a helically coiled elongate strip or wire (similar in shape to helical binders used for books/documents). Alternatively, the resilient material could be a braided material, such as braided wire or braided non-metallic material.

The invention claimed is:

1. A resilient pivot assembly comprising:
   a first housing member and a second housing member held together side-by side and configured to present a central aperture sized to accept a shaft or a shaft sleeve;
   wherein said first housing member has a first groove/channel and said second housing member has a second groove/channel;
   wherein said shaft or said shaft sleeve has a third groove/channel that extends at least partly around a circumference of said shaft or an outer surface of said shaft sleeve;
   wherein said first, second and third grooves/channels cooperate to form a generally annular shaped channel that houses at least one resilient member such that, in use, said shaft or said shaft sleeve is resiliently supported within at least said first and second housing members by said at least one resilient member such that said shaft or said shaft sleeve pivots or fully rotates about an axis of said shaft or said shaft sleeve.

2. The resilient pivot assembly according to claim 1, wherein said at least one resilient member is tubular or generally cylindrically shaped before assembly within housings.

3. The resilient pivot assembly according to claim 1, wherein at least said first groove/channel and said second groove/channel cooperate to form a channel that is substantially semi-circular in cross section.

4. The resilient pivot assembly according to claim 2, where in use an arcuate axis of said resilient member is generally perpendicular to a longitudinal axis of shaft.

5. The resilient pivot assembly according to claim 1, wherein said at least one resilient member is a helical spring.

6. The resilient pivot assembly according to claim 1, wherein the first groove/channel and the second groove/channel comprise a plurality of channels such that said shaft is resiliently supported at a plurality of circumferential locations along its axis.

7. The resilient pivot assembly according to claim 1, wherein the third groove/channel extends around the circumference of said shaft; wherein said shaft and/or said aperture are tapered so as to allow greater non-axial movement of said shaft relative to said housing.

8. The resilient pivot assembly according to claim 1, wherein said shaft has a bore, or said shaft sleeve has a bore; said bore being sized to accept a shaft or rod.

9. The resilient pivot assembly according to claim 1, wherein said resilient member abuts against inside walls of said generally annular channel or fits within and thereby prevents/restrains any movement of said shaft in an axial direction.

10. The resilient pivot assembly according to claim 1, wherein said first groove/channel and said second groove/channel are held together end-on end.

11. The assembly according to claim 1, wherein said shaft forms or supports part of a vehicle anti-roll bar mechanism.

12. The assembly according to claim 1, wherein said shaft is attached to or forms part of a vehicle wishbone suspension member.

13. The assembly according to claim 1, wherein said shaft or said shaft sleeve is configured to partly rotate about the axis of said shaft or said shaft sleeve.

14. A resilient pivot assembly comprising:
   a first housing member and a second housing member held together side-by side and configured to present a central aperture sized to accept a shaft;
   wherein said first housing member has a first groove/channel and said second housing member has a second groove/channel;
   wherein said shaft has a third groove/channel that extends at least partly around a circumference of said shaft;
   wherein said first, second and third grooves/channels cooperate to form a generally annular shaped channel that houses at least one resilient member such that, in use, said shaft is resiliently supported within at least said first and second housing members by said at least one resilient member such that said shaft pivots or fully rotates about an axis of said shaft.

15. The assembly according to claim 14 wherein said shaft is configured to partly rotate about the axis of said shaft.

16. A resilient pivot assembly comprising:
   a first housing member and a second housing member held together side-by side and configured to present a central aperture;
   wherein said central aperture is sized to accept said shaft sleeve;
   wherein said first housing member has a first groove/channel and said second housing member has a second groove/channel;
   wherein said shaft sleeve has a third groove/channel that extends at least partly around an outer surface of said shaft sleeve;
   wherein said first, second and third grooves/channels cooperate to form a generally annular shaped channel that houses at least one resilient member such that in use said shaft sleeve is resiliently supported within at least said first and second housing members by said at least one resilient member such that said shaft sleeve pivots or fully rotates about an axis of said shaft sleeve.

17. The assembly according to claim 16, wherein said shaft sleeve is configured to partly rotate about the axis of said shaft sleeve.

* * * * *